United States Patent [19]

Engel et al.

[11] 4,425,888

[45] Jan. 17, 1984

[54] RPM-GOVERNING SYSTEM FOR AN INTERNAL COMBUSTION ENGINE WITH AUTO-IGNITION

[75] Inventors: Gerhard Engel, Stuttgart; Wolf Wessel, Oberriexingen, both of Fed. Rep. of Germany

[73] Assignee: Robert Bosch GmbH, Stuttgart, Fed. Rep. of Germany

[21] Appl. No.: 391,756

[22] Filed: Jun. 24, 1982

[30] Foreign Application Priority Data

Jul. 30, 1981 [DE] Fed. Rep. of Germany ....... 3130080

[51] Int. Cl.3 ........................ B60K 31/00; F02D 5/04; F02D 9/02; F02B 3/00

[52] U.S. Cl. .................................... 123/339; 123/352; 361/239; 180/179

[58] Field of Search ............... 123/339, 352, 361, 358; 180/179, 176, 105 E; 361/239, 240, 242

[56] References Cited

U.S. PATENT DOCUMENTS

| | | | |
|---|---|---|---|
| 4,113,046 | 9/1978 | Arpino | 123/352 |
| 4,133,406 | 1/1979 | Allerdist | 123/352 |
| 4,157,126 | 6/1979 | Collonia | 123/352 |
| 4,188,926 | 2/1980 | Fleischer | 123/352 |
| 4,196,466 | 4/1980 | Noddings et al. | 123/352 |
| 4,354,467 | 10/1982 | Noddings et al. | 123/352 |
| 4,367,708 | 1/1983 | Nakamura et al. | 123/339 |
| 4,374,422 | 2/1983 | O'Keefe, Jr. et al. | 123/352 |
| 4,383,510 | 5/1983 | Nakamura et al. | 123/352 |

*Primary Examiner*—Raymond A. Nelli

*Attorney, Agent, or Firm*—Edwin E. Greigg

[57] ABSTRACT

An rpm-governing system for an internal combustion engine with auto-ignition is proposed, in which the fuel quantity to be injected at least in the event of idling is subject to the influence of an electromagnetic final control element, in which the control unit for forming the final control element trigger signal includes a regulator having PID behavior and in which the regulation signal is formed in accordance with the actual rpm/set-point rpm deviation. This rpm-governing system has an increase in rpm set-point value, with a retarded drop, this increase in set-point being made to follow up the increase in actual value. The PID regulator furthermore has a non-linear and preferably rpm-dependent P component. The signal end stage includes a pulse length modulator, the output signal of which triggers an electromagnetic final control element while there is a simultaneous current regulating action.

9 Claims, 5 Drawing Figures

FIG.1
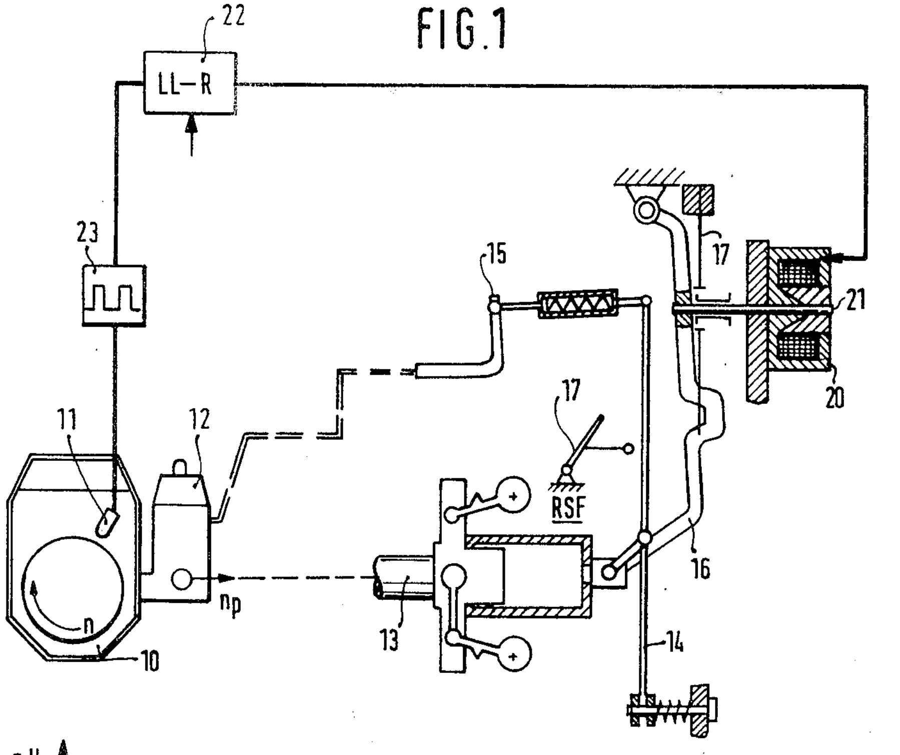
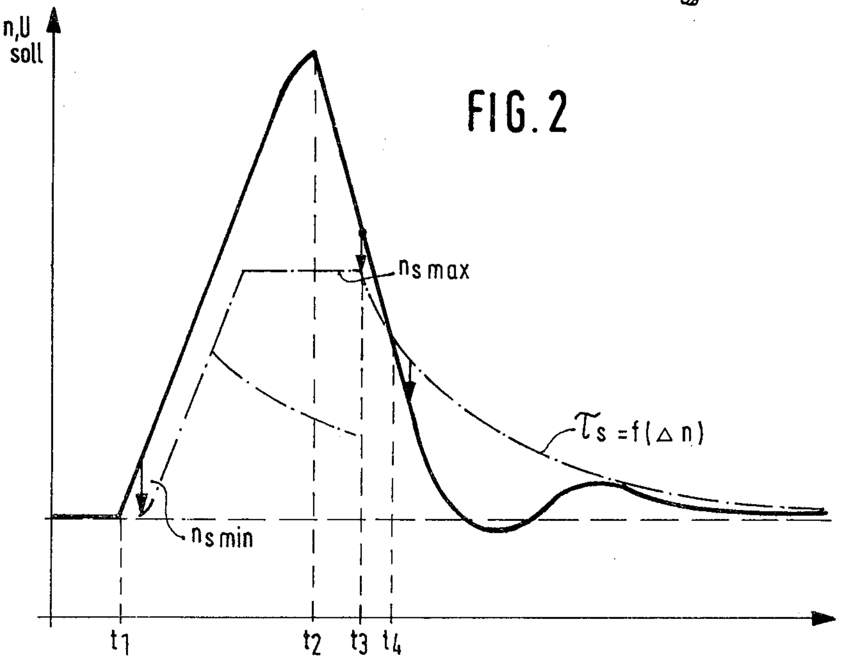
FIG.2

RPM-GOVERNING SYSTEM FOR AN INTERNAL COMBUSTION ENGINE WITH AUTO-IGNITION

BACKGROUND OF THE INVENTION

The present invention relates to an rpm-governing system for an internal combustion engine with auto-ignition having an electromagnetic final control element influencing the quantity of fuel to be injected, at least in the event of idling, a control unit including, preferably, a PID regulator and an actual rpm value/-set-point rpm value deviation detector for forming, together with the control unit, a final control element trigger signal.

In internal combustion engines with auto-ignition, it is known to govern the rpm by means of a PID regulator and to carry the output signal of this regulator to an electromagnetic final control element connected to the regulator rod of the fuel pump of the engine. Although this known system is capable of providing generally satisfactory results, still, both the governing of the idling rpm and the transition into overrunning involve certain difficulties, especially when the engine is cold. That is because when the engine is cold, the rpm drop that occurs when pressure on the driving pedal is released is quite severe, and low amplitude oscillations in the rpm signal can cause the engine to stall. The possibility of counteracting these severe changes in rpm by means of an appropriate D component of the regulator does exist; but the danger then is that interference factors thereby introduced may affect the result of regulation.

OBJECT AND SUMMARY OF THE INVENTION

It is an object of the present invention to provide an improved rpm-governing system of the type described above, and one in which improved control during idling and overrunning operations is achieved.

The invention achieves this object by providing for an increase in the set-point rpm value, which comes into effect if the set-point rpm value is below the actual value by the amount of a minimum difference, the increasing set-point rpm being less than the actual rpm by the amount of the minimum difference.

With the rpm-governing system according to the present invention, quite satisfactory rpm governing is assured, even in critical engine ranges. Further details of the invention provide flexibility in the intervention made by the governor system in accordance with the operational state of the engine. Finally, it is assured that the governor will come into action only after a specific minimum rpm threshold has been exceeded, and provisions in the end state for triggering the final control element serve to prevent short-circuiting.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 is a basic illustration of the rpm-governing system according to the present invention;

FIG. 2 is a diagram explaining the operation of the system;

DESCRIPTION OF THE PREFERRED EMBODIMENTS

Figure 3:
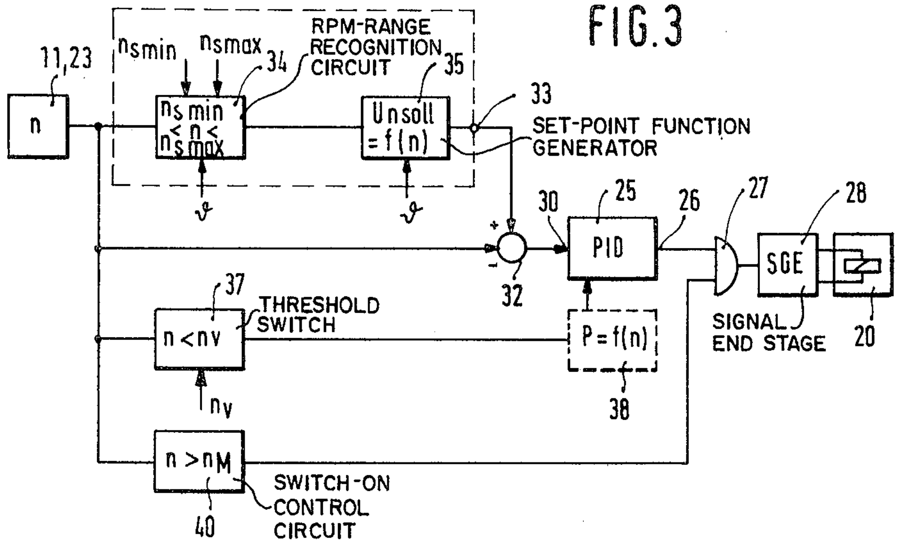
FIG. 3 is a block circuit diagram of the electrical portion of the governor.

The rpm-governing system according to the present invention for an internal combustion engine with auto-ignition will now be described in connection with the rpm governor disclosed in German Offenlegungsschrift (laid-open application) No. 29 02 731. A simplified illustration of this governor is provided in FIG. 1. Here, the crankshaft rpm of the internal combustion engine 10 is ascertained by means of an rpm sensor 11, and the engine is supplied with fuel via a pump 12. Reference numeral 13 indicates a flyweight apparatus for rpm-dependent regulation of the fuel quantity. This apparatus 13 acts via a governor lever 14 upon a governor rod 15, and the position of a guide lever 16 additionally affects the fuel quantity. A driving pedal 17 also acts upon the governor lever 14. An idling spring 19 is disposed on the guide lever 16 and exerts force in the direction of an increased fuel quantity. The same effect is attained by an electromagnetic final control element 20, the armature of which presses in the direction of an increased fuel quantity when it is in the excited state. The electromagnetic final control element 20 is triggered by an idling governor 22, shown in block form in the drawing, to which at least an rpm signal, generated via a pulse forming circuit 23, is delivered.

The apparatus seen in FIG. 1 does not represent any improvement per se over the prior art. However, it serves to explain the points where the electronic rpm-governing system described below can intervene in engine operation to perform its function.

FIG. 2 shows one of the primary characteristics of the rpm-governing system according to the invention. The actual rpm over time is plotted here as a solid line, while the set-point rpm is plotted as a dot-dash line. A broken line represents a nominal set-point value, which in the simplest case corresponds to the normal idling-rpm value.

At time $t_1$, the driver depresses the driving pedal, and the actual rpm increases. After the attainment of a specific rpm difference between actual rpm and the nominal set-point value, that is, a minimum threshold value $ns_{min}$, also called the insensitivity threshold, the set-point rpm value begins to follow the actual rpm value, while the insensitivity threshold $ns_{min}$ is kept unchanged. However, an upper threshold $ns_{max}$ for the set-point rpm assures that the increase in set-point value will not be effective over the entire rpm range.

If the driver of the vehicle equipped with the engine in question should at time $t_2$ desire to slow down, then he will let up on the position of the driving pedal, thereby initiating a drop in rpm. At time $t_3$, the actual rpm value, reduced by the minimum threshold value, attains the upper set-point rpm threshold $ns_{max}$, with the result that the set-point rpm value is then reduced as well. This reduction does not, however, take place analogously to the drop in actual rpm; instead, it occurs in a retarded manner, as indicated by the dot-dash line $\tau_s = f(\Delta n)$, which is an approximation of the rpm drop when the engine is at its operational temperature. Thus a deviation occurs quite early (at time $t_4$), and so a stabilizing process for the rpm deviation also takes place quite early. Only very small oscillations in the actual rpm signal accordingly result, and depending on the design of the system they can even be avoided entirely. The danger that the engine will die because of an excessive rpm drop thus no longer exists.

The regulation sketched in FIG. 2 can be realized with an electronic circuit layout as shown in FIG. 3.

The central component of the apparatus of FIG. 3 is a PID regulator 25, the output of which acts via an AND gate 27 upon the signal end stage 28 and finally upon the exciter winding of the electromagnetic final control element 20. On of the two inputs 30 and 31 of the PID regulator 25 is coupled with a subtraction circuit 32, to which both rpm signals from the rpm sensor 11 and the output signal of the rpm set-point circuit 33 can be supplied. This rpm set-point control circuit 33 includes an rpm-range recognition circuit 34 and a set-point function generator 35.

The P component of the regulator can be adjusted in accordance with rpm via the second control input 31. To this end, an rpm threshold switch 37 and a subsequent P-value control circuit 38 are provided. The PID regulator 25 thus receives a non-linear P amplification. Specifically, this means that for large deviations, which occur at excessively low engine rpm just when there is sudden actuation of the gas pedal such as at the transition to overrunning, an increased P amplification of the PID regulator is effected.

Finally, a switch-on control circuit 40 serves to assure that the electromechanical final control element 20, which when excited furnishes an increased quantity of fuel, can be switched on only above a predetermined rpm value. This value is below the operating rpm range (maximum undercutting). At zero rpm or if the rpm sensor fails, then heating up of the final control element by persistent current is precluded.

The mode of operation of the circuit layout shown in FIG. 3 will now be explained in connection with the subject of FIG. 1:

In purely mechanical rpm regulation, the governor rod 15 is set to the position at which the centrifugal force of the flyweights 13 and the spring force of the idling spring 19 are in balance.

In electronic idling regulation, the force of the idling spring exerted counter to centrifugal force is augmented by the force of an electromagnet in the electromagnetic final control element 20, so that when the magnet is excited the governor rod 15 is additionally adjusted in the direction of an increased fuel quantity.

The excitation of the magnet and thus the adjustment in the direction of an increased fuel quantity are varied by the electronic governor via the end stage such that the engine speed assumes the firmly established, constant set-point value of 725 rpm, for example.

The trigger signal for the electromagnetic final control element is modulated in its pulse length.

The non-linear P amplification of the PID regulator 25 is particularly helpful in the transition to overrunning, because in that case, with severe undercutting of the engine rpm, a large magnetic excitation comes into play; this in turn, by causing a large increase in injection quantity, prevents the engine from stalling.

The rpm set-point value control circuit 33 first asks whether the actual rpm is above the nominal set-point rpm by the amount of a predetermined minimum threshold value. If this is the case, then the set-point value in the set-point value function generator is increased to a value which is below the actual rpm by the amount of the minimum threshold $ns_{min}$. This assures that the governor will recognize the fact that the actual rpm is higher than the set-point rpm and will thus not excite the magnet in the electronic final control element 20. Should the actual rpm then drop once again, then the increased set-point value formed in the set-point value function generator 35 is reduced again as well. In any case, a predetermined time constant is admitted for this reduction. If the actual rpm should drop more rapidly than the increased set-point value, then the effect described in connection with FIG. 2 will occur; that is, the deviation which occurs will be settled again very quickly.

The time constant with which the increased set-point value can drop is adapted to the behavior of the engine when it is at its operational teperature.

Figure 4:
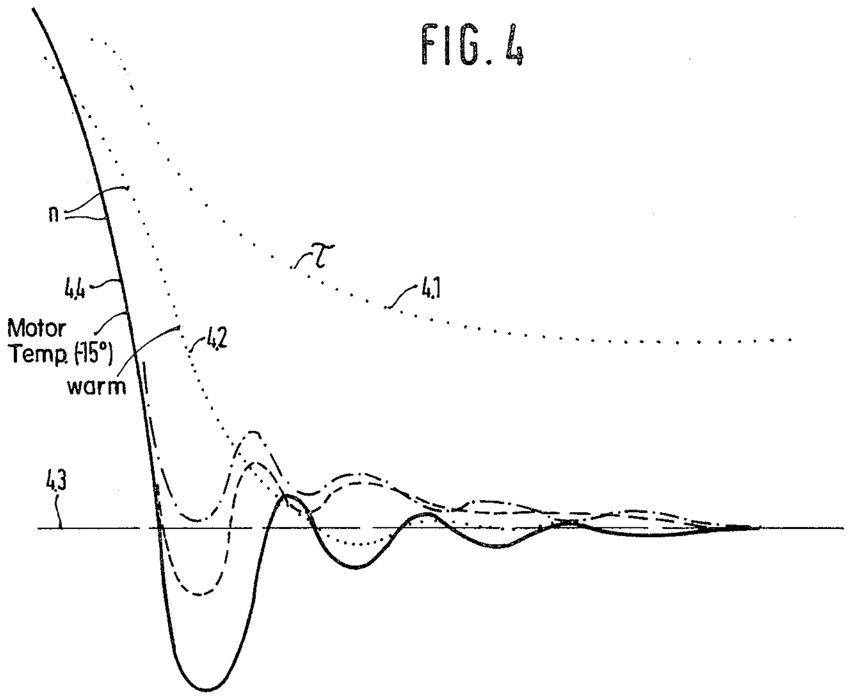
FIG. 4 provides diagrams which illustrate the behavior of the engine with various kinds of governing.

For the sake of explaining the signal behavior of the rpm-governing system in greater detail, FIG. 4 shows various curve profiles at the transition from normal engine operation to overrunning. The dotted curve path 4.1 indicates the set-point rpm drop which has been increased and, in an appropriate operational state, retarded. Curve 4.2 indicates the actual-rpm drop when the engine is at its operational temperature; it is apparent that there is only a slight oscillation in this actual rpm value below the nominal set-point rpm value for idling, which is indicated by the line 4.3.

Since friction losses are substantially greater in an engine which is cold, a very steep drop in rpm also occurs in a cold engine. This is indicated by curve 4.4, with a temperature of $-15°$ C. given as an example. The initially single line splits into three lines, having different oscillations. The line with the largest oscillations is characteristic of a regulator with pure PID operation, without making any increase in the set-point rpm. The broken line with the second-largest oscillations indicates the corresponding situation where an increase is made in the set-point rpm. Finally, the dot-dashed line illustrates the behavior of an engine where there is a PID regulator having an increase in the setpoint rpm as well as a non-linear P amplification.

This family of curves shown in FIG. 4 clearly illustrates the advantages of the rpm-governing system according to the present invention, because the absence of oscillations at the transition from normal operation to overrunning avoids oscillations and thus eliminates the danger that the engine will stall.

Figure 5:
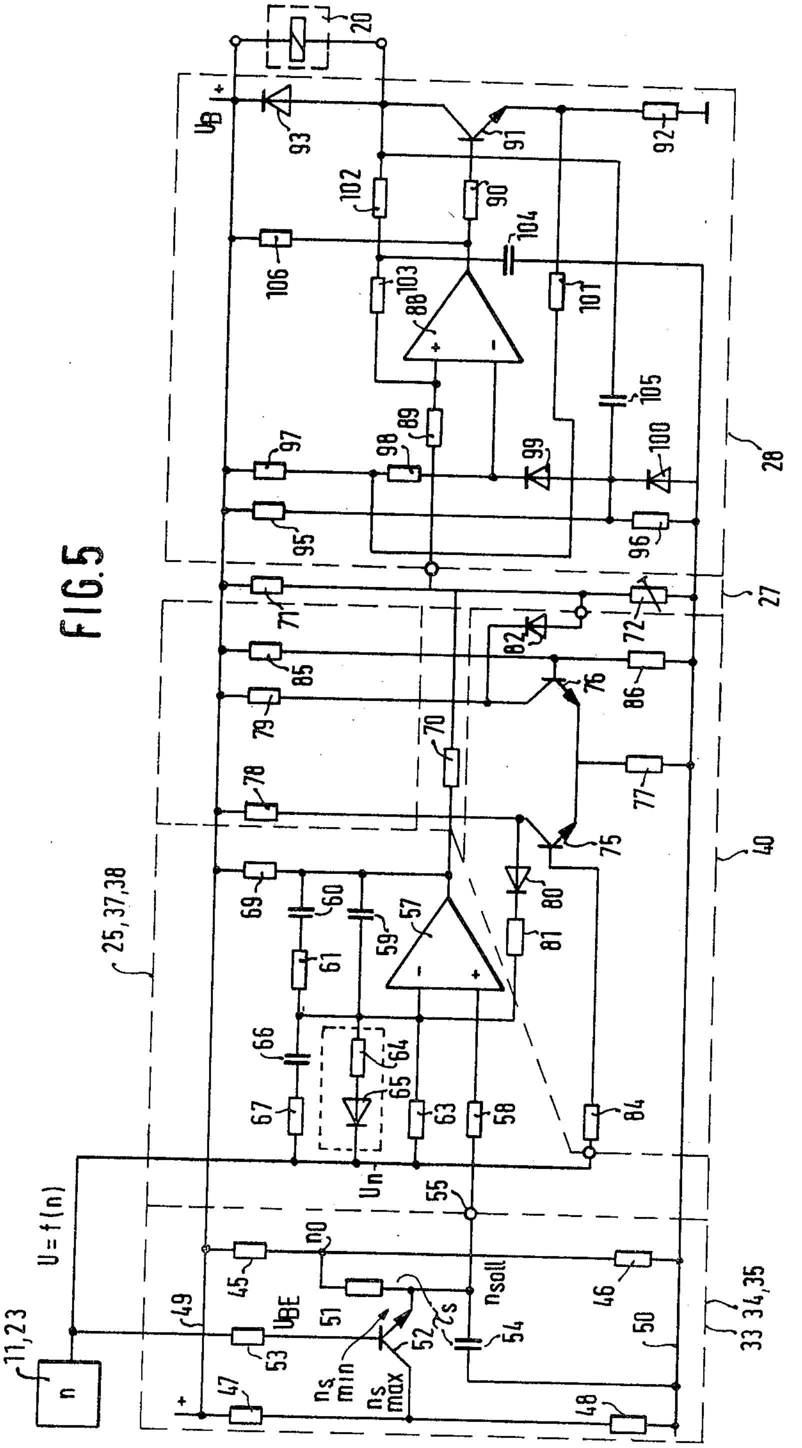
FIG. 5 is a more-detailed circuit diagram of the governor, including the end stage for the electromagnetic final control element.

A more-detailed exemplary embodiment of the subject of FIG. 3 is given in FIG. 5. The same reference numerals as in FIG. 3 are used for the same structural component. The rpm set-point control circuit 33 of FIG. 3 has, in the subject of FIG. 5, two voltage dividers with the resistors 45–48 disposed between a positive line 49 and a ground line 50. A series circuit comprising the resistor 51 and the collector-emitter path of a transistor 52 is disposed between the two middle terminals of the voltage dividers. The base of the transistor 52 is connected via a resistor 53 with the rpm sensor 11. Both a capacitor 54 connected to ground and the output 55 of the rpm set-point control circuit 33 are connected at the connecting point between the resistor 51 and the emitter of the transistor 52.

The PID regulator 25 includes a differential amplifier 57, the positive input of which is connected via a resistor 58 with the output 55 of the rpm set-point control circuit 33. The differential amplifier has negative feedback both via a capacitor 59 and via a capacitor-resistor series circuit having the components 60 and 61. The negative input of the differential amplifier 57 furthermore is connected via a three-stage parallel circuit comprising the resistor 63, resistor and diode 64, 65 and capacitor and resistor 66, 67 with the output of the rpm sensor 11. On the output side, the differential amplifier 57 is connected first via a resistor 69 to the positive lead 49 and then via a resistor 70 to the junction of a voltage divider comprising two resistors 71 and 72 between the battery voltage terminals. This voltage divider, together with the remaining circuitry, makes up the AND gate 27 of the subject of FIG. 3. As shown in FIG. 5, the switch-on control circuit 40 of FIG. 3 comprises a differential amplifier having two transistors 75 and 76, whose emitters are combined and carried to the ground line 50 via a resistor 77. The collectors of these transistors 75 and 76 are each connected via respective resistors 78 and 79 to the positive line 49. While the collector of the transistor 75 is additionally coupled via a series circuit of a diode 80 and resistor 81 to the negative input of the differential amplifier 57, the collector of the transistor 76 is connected via a diode 82 with the middle terminal of the voltage divider comprising the two resistors 71 and 72. Finally, the base of the transistor 75 receives the control signal via a resistor 84 from the rpm sensor 11 and the base of the transistor 76 is connected to a constant voltage potential, which is formed by means of a voltage divider comprising the resistors 85 and 86 and located between the operating voltage terminals.

The signal end stage 28 likewise includes a differential amplifier 88, at the positive input of which the regulator output signal arrives from the AND gate 27 via a resistor 89. On the output side, a resistor 90 leads from the differential amplifier 88 to the base of a switching transistor 91, from the emitter of which a resistor 92 is connected to ground and whose collector is connected to the positive line 49 via a parallel circuit comprising a free-running diode 93 and the exciter winding of the electromagnetic final control element 20. Two further voltage dividers having the resistors 95, 96 and 97, 98 with a series circuit of two diodes 99 and 100 are located between the two battery voltage terminals. The resistor 96 and the diode 100 are parallel, and the connecting point of the diode 99 and the resistor 98 is coupled with the negative input of the differential amplifier 88. The further connecting point in this voltage divider between the resistors 97 and 98 is connected via a resistor 101 to the connecting point of the emitter of the transistor 91 and the resistor 92. Finally, the collector of the transistor 91 is also connected to the positive input of the differential amplifier 88 via a series circuit of two resistors 102 and 103, and the connecting point of these two resistors is connected to ground via a capacitor 104. A further capacitor 105 leads from the collector of the switching transistor 91 to the connecting point of the two diodes 99 and 100. Finally, the output of the differential amplifier 88 is also coupled via a resistor 106 with the positive line 49.

The mode of operation of the circuit layout shown in FIG. 5 is as follows:

In the rpm set-point control circuit 33, the output signal at the state of rest is determined by the ratio of the two resistors 45 and 46. This ratio fixes the value of the nominal set-point value. If the output voltage of the rpm evaluation circuit changes, then as soon as the base-emitter voltage of the transistor 52 is exceeded, this transistor becomes conductive, and the output signal is additionally influenced by the voltage divider 47, 48. The base-emitter voltage equals the value $ns_{min}$, the minimum threshold value of FIG. 2. The temperature dependency of the base-emitter path of the transistor 52 has a favorable effect in this case, because when the engine is cold and there is high non-uniformity of the rpm, the insensitive zone is thus relatively high as well. As the output voltage of the rpm evaluation circuit becomes higher, the emitter potential of the transistor 52 is also increased, so that the output signal increases, at the maximum up to a value ($ns_{max}$) determined by the voltage divider ratio of the resistors 47, 48. At the output terminal 55 of the rpm set-point control circuit 33, the result is accordingly a followed-up rpm set-point value, and its delay in dropping is determined by the capacity of the capacitor 54, among other factors.

The capacitor-resistor combination of the elements 59, 60 and 61 determines the integration behavior of the PID regulator 25. The D component is fixed by the capacitor 66 and resistor 67. The P component is determined in the lower signal range by the resistor 63, and the rpm-dependent proportional component is brought about by the combination of the resistor 64 and diode 65, which becomes conductive above a predetermined voltage value. This voltage value is defined in the present example by the pass-through voltage of the diode 75.

By means of the switch-in control circuit 40, a precise rpm value nM can be defined via the voltage divider ratio of the resistors 85 and 86, where the lower threshold of the operational range of the regulator for the idling rpm is effective. The supplementary intervention made at the negative input of the differential amplifier 57 prevents this element from striking a stop at an rpm below this threshold value, thus preventing the output potential of the differential amplifier 57 from sticking at the saturation point for any length of time.

The primary characteristic of the signal end circuit is the conversion of an analog input signal into a pulse-width-modulated output signal. This purpose is attained by the capacitor 105 in combination with the individual resistors, such as resistor 96. The RC combination with the resistors 102 and 103 and the capacitor 104 serve to effect negative feedback of the differential amplifier 88 if a change in resistance of the exciter coil of the electromagnetic final control element 20 occurs. This might happen because of heating of the final control element, for instance, while there was a high fuel requirement.

Finally, the measuring resistor 92 (0.1–5 ohm) in series with the exciter winding of the final control element 20 and of the switching transistor 91 enables a further current regulation in order to become substantially independent of fluctuations in battery voltage.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An rpm-governing system for an internal combustion engine with auto-ignition, comprising:

an actual rpm value generator;

a set-point rpm value generator;

actual rpm/set-point rpm value deviation generating means connected to the actual rpm generator and the set-point rpm generator for generating a deviation signal representing the difference between the actual rpm value and the set-point rpm value at any given time;

an electromagnetic final control element influencing the quantity of fuel to be injected, at least during idling; and a regulator connected to the final control element and the actual rpm/set-point rpm value deviation generating means for forming a trigger signal for the final control element in accordance with the deviation signal, said regulator having, preferably, PID behavior, wherein:

(i) the set-point rpm value generator is connected to the actual rpm value generator and detects when a predetermined minimum difference occurs between the actual rpm value and the set-point rpm value; and (ii) the set-point rpm value generator generates an increasing set-point value once said predetermined minimum difference occurs, said increasing set-point value being less than the actual rpm value by the amount of the minimum difference.

2. The rpm-governing system as defined in claim 1, wherein:

(iii) the set-point rpm value generator includes means establishing a maximum value for the increasing set-point value.

3. The rpm-governing system as defined in claim 1, further comprising:

means generating an rpm threshold value, wherein:

(iii) the regulator becomes effective at an rpm value above the rpm threshold value.

4. The rpm-governing system as defined in claim 3, further comprising:

an AND gate connected to the regulator; and a signal end stage connected to the final control element and the AND gate, wherein:

(iv) the means for generating an rpm threshold value includes a differential amplifier having two transistors, the collector of one transistor being coupled with the regulator and the collector of the other transistor being coupled with the AND gate, the base of said one transistor being exposed to an rpm signal.

5. The rpm-governing system as defined in claim 1, further comprising:

a P component controller connected to the regulator, wherein:

(iii) at least the P component of the PID regulator is controlled by the P component controller.

6. The rpm-governing system as defined in claim 5, wherein:

(iv) the control of the P component is effected in accordance with rpm.

7. The rpm-governing system as defined in claim 1, further comprising:

a signal end stage connected to the final control element, wherein:

(iii) the final control element is triggered in a checked manner by the signal end stage.

8. The rpm-governing system as defined in claim 1, wherein the set-point rpm value generator includes:

(a) voltage supply terminals;

(b) two voltage dividers connected between the voltage supply terminals;

(c) a circuit comprising a transistor and a resistor connected between the junction point of each voltage divider, the base of the transistor receiving an rpm signal and the connecting point of the resistor and transistor being connected directly to the output of the set-point rpm value generator; and (d) a capacitor connected to the connecting point of the resistor and transistor and to a voltage supply terminal.

9. The rpm-governing system as defined in claim 1, wherein the profile of set-point rpm value drop approximates the actual rpm value drop existing when the engine is at operational temperature.

* * * * *